United States Patent [19]

Tisbo et al.

[11] 4,112,853
[45] Sep. 12, 1978

[54] SHELVING APPARATUS

[75] Inventors: Cosmo N. Tisbo, Barrington; Thomas A. Tisbo, Roselle, both of Ill.

[73] Assignee: Custom Plastics, Inc., Elk Grove Village, Ill.

[21] Appl. No.: 812,668

[22] Filed: Jul. 5, 1977

[51] Int. Cl.² .............................................. F16B 7/00
[52] U.S. Cl. .................... 108/111; 108/159; 403/172
[58] Field of Search .............. 108/111, 114, 159; 211/191, 182; 403/171, 172, 176, 295

[56] References Cited

U.S. PATENT DOCUMENTS

| | | | |
|---|---|---|---|
| Re. 28,244 | 11/1974 | Evans | 108/111 X |
| 2,651,982 | 9/1953 | Weaver | 108/159 X |
| 3,218,097 | 11/1965 | Bowers et al. | 403/295 |
| 3,711,133 | 1/1973 | Werner | 403/172 |
| 3,883,257 | 5/1975 | Delafield | 403/172 |
| 3,886,710 | 6/1975 | Krause et al. | 403/172 X |
| 3,958,517 | 5/1976 | Jay | 108/159 |
| 4,023,913 | 5/1977 | Berkowitz | 403/172 |
| 4,027,987 | 6/1977 | Berkowitz | 403/172 |

Primary Examiner—Francis K. Zugel
Attorney, Agent, or Firm—Anthony S. Zummer

[57] ABSTRACT

A shelving apparatus having a plurality of joint connectors to which is fastened a plurality of stringers is disclosed herein. Each of the joint connectors has a cubical center box from which a plurality of arms extends. Each of the arms extending from the cubical center box extends perpendicular to a face of the cubical center box to which each arm is connected. Each of the arms has a pair of free edges extending along each of the arms. Each of the arms has a U-shaped cross-section. Each of the stringers has a hollow square cross-section. The stringers are fitted to respective arms of the joint connectors. A plurality of shelves is supported by the stringers.

2 Claims, 9 Drawing Figures

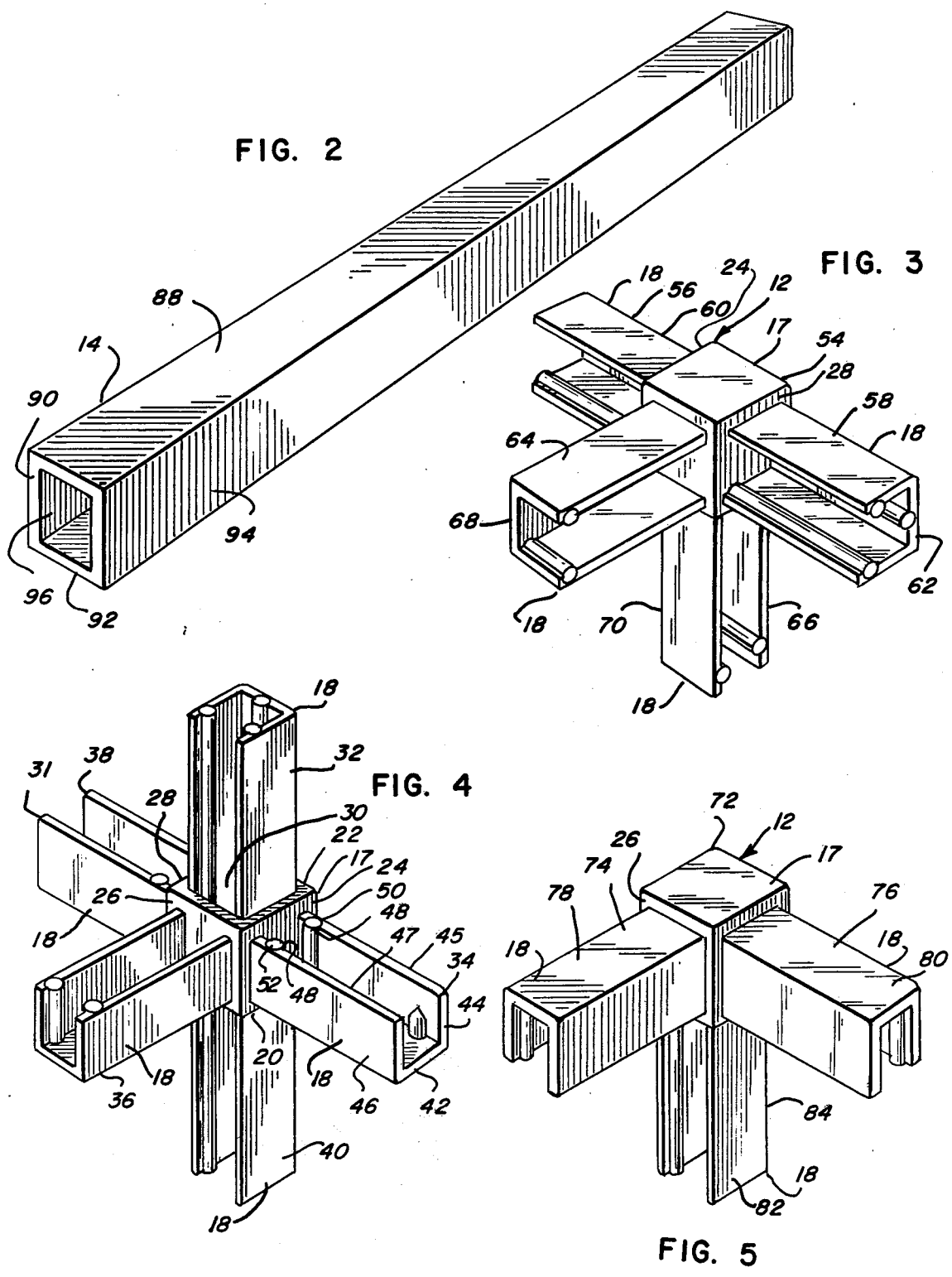

SHELVING APPARATUS

BACKGROUND OF THE INVENTION

Knock-down shelving apparatus, per se, is well known in the art. A typical example of knock-down shelving apparatus is disclosed in U.S. Pat. No. 3,255,721 to Peterschmidt. The Peterschmidt patent teaches a composite structure utilizing a novel assembling joint. The novel assembling joint has a plurality of arms having rectangular and tapering circular conical arms extending in square end pieces. Structures such as the Peterschmidt structure, while adequate for some tasks, do not provide light weight, easy to manufacture shelving.

The composite joints of the prior art, such as Peterschmidt, often teach a relatively complicated arm geometry which is not easy to mold or to cast. In addition, the prior art joint structures often do not provide for high strength and rigidity with relatively light weight. A number of prior art shelving structures are well known to men skilled in the art, but do not combine high rigidity with light weight and easy to manufacture.

What is needed then, is a rigid, light weight, easy to manufacture shelving structure which can be put together or knocked down in a short space of time. The shelving apparatus should also have a flush fit frame and flush fit shelving.

SUMMARY OF THE INVENTION

A shelving apparatus having a plurality of joint connectors is disclosed herein. Each of the joint connectors has a central cubical hub. A plurality of arms extends from respective faces of the central cubical hub. Each arm of the plurality of arms has a U-shaped cross-section and has a base rectangular wall section and pair of substantially rectangular side walls formed integral with and perpendicular to the base rectangular wall section. Each of the substantially rectangular side walls has a free edge. Each wall of each of the arms has a width slightly less than a width of the face of the central cubical hub to which it is attached. A plurality of square cross-section stringers is connected to each of the joints. Each stringer is connected to a respective arm of the joint connector. The square interior of each stringer is very slightly smaller than the exterior of each of said arms so that the stringer can be fitted snugly over each arm. The wall thickness of the walls of each of the stringers is substantially equal to the difference between the width of the central cubical hub and the width of the walls of the stringers so that the stringers fit flush with the central cubical hub.

It is a principal object of the present invention to provide a shelving structure which is light weight, economical and rigid.

It is another object of the present invention to provide a shelving apparatus having a plurality of flush mounted shelves seated upon said stringers.

It is a still further object of the present invention to provide a shelving apparatus having a flush fit frame.

Other objects and uses of the present invention will become obvious to one skilled in the art upon a perusal of the following specification and claims in light of the accompanying drawings.

BRIEF DESCRIPTION OF THE DRAWINGS

FIG. 2 is a perspective view of a stringer of the shelving apparatus of FIG. 1;

FIG. 3 is a perspective view of a joint connector of the shelving apparatus having four arms;

FIG. 4 is a perspective view of a joint connector of the shelving apparatus having five arms;

FIG. 5 is a perspective view of a joint connector of the shelving apparatus having three arms;

DESCRIPTION OF THE PREFERRED EMBODIMENT

Figure 1:
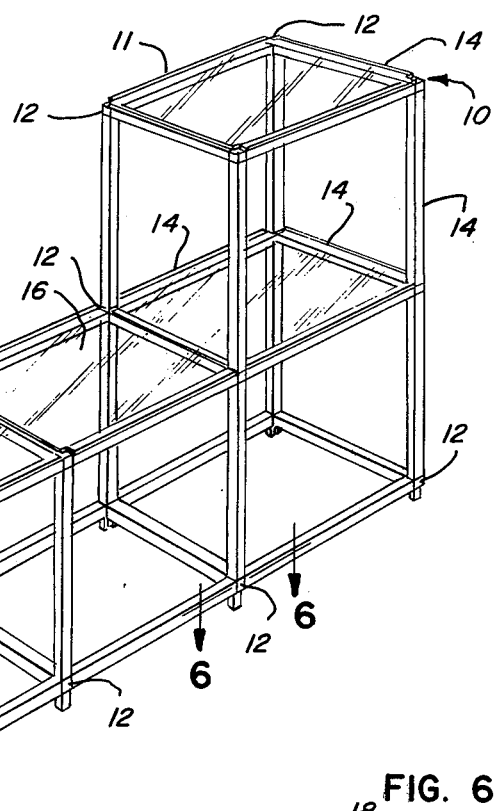
FIG. 1 is a perspective view of an assembled shelving apparatus, having a portion in phantom view, embodying the present invention.

A shelving apparatus embodying the instant invention and generally identified by numeral 10 is disclosed herein. Shelving apparatus 10 includes a frame 11 having a plurality of joint connectors 12 to which is interconnected a plurality of stringers 14. A plurality of shelves 16 is mounted on frame 11.

Each of the joint connectors 12 has a center box 17 and a plurality of arms 18 extending from center box 17. Center box 17 is a cubical box having five square walls respectively numbered 20, 22, 24, 26 and 28. Walls 22, 24, 26 and 28 define a square aperture 30.

Taking as an example a joint 31 of plurality of joint connectors 12 shown in FIG. 4 having five arms, it may be appreciated that this exemplary joint has a plurality of substantially identical arms respectively numbered 32, 34, 36, 38 and 40. Arm 32 extends into the square aperture 30. Arm 34 is formed integral with and perpendicular to wall 24. Arm 36 is formed integral with and perpendicular to wall 26. Arm 38 is formed integral with and perpendicular to wall 28 and arm 40 is formed integral with and perpendicular to wall 20.

Taking arm 34 as an exemplary arm, it will be noted that arm 34 has a first base wall 42. Base wall 42 is a substantially rectangular wall having rounded corners and is slightly less wide than the width of the wall 24 of box 17. A substantially rectangular side wall 44 having the same dimensions as rectangular base wall 42 is positioned perpendicular to wall 42 and is formed integral therewith. Rectangular side wall 44 has a free edge 45. Rectangular side wall 44 is slightly tapered and has its widest portion adjacent wall 24. A substantially rectangular side wall 46 having the same dimensions as walls 42 and 44 is formed integral with and perpendicular to wall 42 opposite wall 44. Substantially rectangular side wall 46 has a free edge 47. Substantially rectangular side wall 46 is also slightly tapered and has its widest portion adjacent wall 24. A pair of substantially parallel bead cylinders 48, respectively numbered 50 and 52, is formed integral with walls 44 and 46, respectively, immediately adjacent each other. The arms 32, 36, 38 and 40 each have two or more bead cylinders. All bead cylinders in the joint connector are positioned parallel to each other despite the orientation of the arms to which they are attached. Arms 34, 36 and 38 have coplanar base walls. Arms 32 and 40 have coplanar base walls. The base walls of arms 32 and 40 are not coplanar with the base walls of arms 34, 36 and 38. The beads in each of the arms serve to stiffen the arms to provide greater rigidity and also to allow easy removal of the joint from a mold in which it is manufactured. The joint connectors are unitary molded joint connectors and are composed of a high impact styrene.

Referring now to FIG. 3, a joint connector 54 of plurality of joint connectors 12 is shown therein. Joint connector 54 also has a center box 17 and arms 18. The center box and arms of joint connector 54 are substantially identical to the center box and arms of joint connector 31. Joint connector 54, however, has only four arms. A pair of arms 56 and 58 is formed integral with opposite walls 24 and 28 of center box 17 and have coplanar respective base walls 60 and 62. An arm 64 is positioned perpendicular to arms 56 and 58. An arm 66 is positioned perpendicular to arms 56, 58 and 64. Arms 64 and 66 have respective base walls 68 and 70 which are coplanar. However, walls 60 and 62 are not coplanar with walls 68 and 70.

Referring now to FIG. 5, a joint connector 72 of plurality of joint connectors 12 is shown therein. Joint connector 72 has a center box 17 and a plurality of arms 18. Joint connector 72 has three arms. The center box and arms of joint connector 72 are substantially identical to the center boxes and arms of joint connectors 31 and 54. A first arm 74 is formed integral with wall 26 of center box 17. An arm 76 is positioned perpendicular to arm 74. Arms 74 and 76 have respective coplanar base walls 78 and 80. An arm 82 is positioned perpendicular to arms 74 and 76. Arm 82 has a base wall 84 which is positioned perpendicular to base walls 78 and 80.

Figure 6:
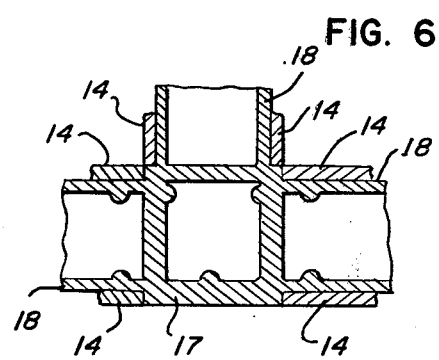
FIG. 6 is a view taken along line 6—6 of FIG. 1 of a bottom joint connector and details of the abutting relationship between the joint connector and stringers with portions broken away.
Figure 7:
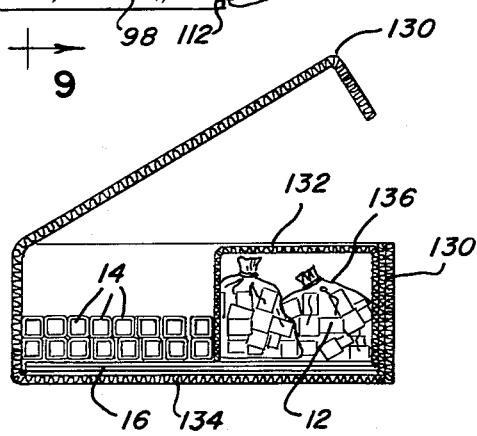
FIG. 7 is a cross-sectional view of the shelving apparatus as they are packed for shipment and sale in a packing container.

Stringers 14 each have a first wall 88, a second wall 90, a third wall 92 and a fourth wall 94. Walls 88, 90, 92 and 94 are rectangular and are arranged in a square. The walls define a square opening 96 within stringer 14. Each of the walls has a wall thickness substantially equal to the distance between respective arms and adjacent outer edges of the center box 17. Each of the walls has a width of 2.54 centimeters. Thus, a stringer can be fitted over a respective arm to fit flush to abut with the center box 17 as is shown in FIG. 6. In the preferred embodiment of the present invention, the stringers are all 30.48 centimeters in length. In other embodiments of the invention, the stringers may be of differing lengths to provide for differing size shelving structures. Stringers 14 are composed of high impact styrene and are manufactured by extrusion.

Figure 8:
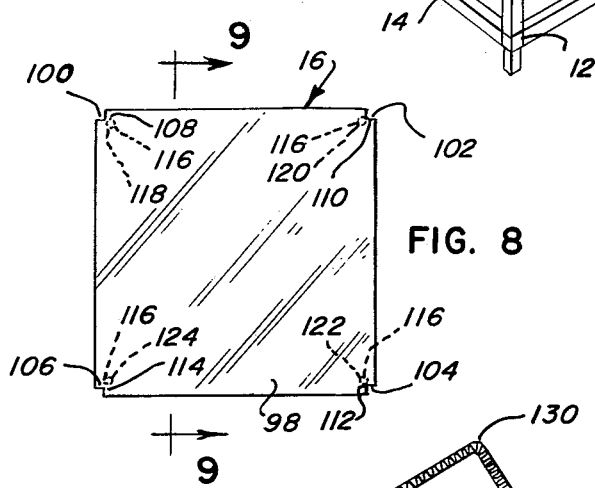
FIG. 8 is a bottom view of a shelf showing details of shelf pins and notches.
Figure 9:
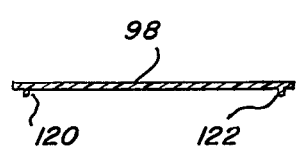
FIG. 9 is a sectional view of the shelf taken along line 9—9 of FIG. 8.

Referring now to FIGS. 8 and 9, shelf 16 is a substantially square shelf having a thin, translucent, frosted shelf sheet 98. Shelf sheet 98 has a width of 33.02 centimeters and a length of 33.02 centimeters in the present embodiment. Shelf 16 is composed of a general purpose styrene which is frosted to increase frictional engagement of objects with the styrene and also to provide a pleasing appearance. The frosting allows transmission of light through the shelves which is often desirable if plants are placed on the shelves. Shelf sheet 98 has a first corner notch 100, a second corner notch 102, a third corner notch 104, and a fourth corner notch 106, respectively positioned in each of the corners of the shelf sheet. Each of the notches 100, 102, 104 and 106 are right angle notches having respective apices 108, 110, 112 and 114. Notches 100, 102, 104 and 106 are adapted to be fitted against stringers 14 to prevent shelf 16 from sliding off frame 11. In addition, a plurality of pins 116, respectively numbered 118, 120, 122 and 124 is positioned perpendicular to shelf sheet 98 immediately adjacent apices 108, 110, 112 and 114 of respective notches 100, 102, 104 and 106. The pins prevent shelf 16 from sliding off the stringers when shelf 16 does not engage the vertical stringers.

The shelving apparatus is packed in a packing box 130 in its knocked-down state. Packing box 130 has a partition 132 which can be removed from the box. A bottom 134 of the box 130 is slightly larger than shelf sheets 98. Shelf sheets 98 are packed on the bottom of the box. The partition 132 is then set on shelf sheets 98 and stringers 14 are positioned parallel with partition 132. Joint connectors 12 are packed in plastic bags 136. The joint connectors are segregated in separate plastic bags according to the number of arms they have. Box 130 thus provides a compact storage arrangement for the shelving apparatus for shipment, sale, or when the apparatus is not in use.

In operation, a cube can be formed from twelve stringers and eight connecting joints, each connecting joint having three arms each. The arms of the connecting joints 12 are simply slid into the square apertures 96 of stringers 14 to engage frictionally the four stringer walls. The slight taper of the side rectangular walls allows the arms to engage the stringers more positively as the arm is forced into the stringer.

It may be appreciated that if four connecting joints are substituted having four arms each, an extra arm will be left over from each connecting joint and this arm can be positioned parallel to vertical stringers so that the cube has a plurality of feet to rest upon. Other more complicated multiple cube structures, such as the structure shown in FIG. 1, can also be assembled.

The square stringers fit flush with the center boxes of the joints so that a smooth and pleasing finish is obtained across the surfaces of the stringers which form the cube. The semi-rectangular arms which extend from the center boxes of the joints provide a superior rigidity since the entire length of the arm is in contact with the interior of the stringer to thus provide the stringer with high rigidity. The high rigidity of the arms of the joint, nevertheless, is not compromised by a certain amount of flexibility which is obtained with the free edges of the open-sided rectangular arms. Thus, the two free walls of the arms, walls 44 and 46, can be compressed together slightly opposite wall 42 so that the arm can be introduced into the stringer with relative ease.

After the cube has been formed, shelving 16 can be laid on top of the stringers 14. The respective shelf sheets 98 only extend half way across each stringer. Therefore, if a number of cubes are interconnected together, the shelf sleeves 98 fit flush so that a number of shelf sheets 98 can provide a smooth and relatively unbroken planar surface across the entire structure.

Since only a portion of the arms of any joint have coplanar base walls, the varying base wall planes lend more rigidity to joint 12 than a totally coplanar structure would. The high impact styrene construction of the frame 11 can be produced relatively inexpensively as can the general purpose styrene construction of the sheets. The joint connectors and stringers are molded from the high impact styrene. The novel construction of the joint connectors allows easy molding. Molding provides a relatively inexpensive method of producing the frame elements. The slight taper of the side walls of the arms allows the arms to be removed easily from molds during manufacture.

It may be appreciated that since the frame is easy to assemble and disassemble, a variety of constructions can be made from the basic elements of the joints 12, stringers 14 and shelves 16. Thus, a person can easily change the structure of his shelving apparatus from one shape to another.

Although a specific embodiment of the herein disclosed invention has been described in detail above, men skilled in the art may make various modifications and changes to the invention of this patent without departing from the spirit and scope of the invention herein. It is to be expressly understood that the invention described herein is only limited by the claims.

What is claimed is:

1. A shelving apparatus for holding articles comprising: a plurality of unitary molded joint connectors composed of high impact styrene, each unitary molded joint connector of said plurality having a hollow cubical center section and a plurality of arms having U-shaped cross-sections extending from the hollow cubical center section, each arm being positioned substantially perpendicular to a respective face of said hollow cubical center section, each arm of said plurality of arms having a first substantially rectangular wall extending the length of the arm, a second substantially rectangular tapered wall being formed integral with and perpendicular to the first substantially rectangular wall, a third substantially rectangular tapered wall being formed integral with and perpendicular to the first substantially rectangular wall, said second and third substantially rectangular tapered walls each having a respective free edge, each of said arms having a pair of beads formed therein, each pair of beads on a given joint connector being parallel to each other pair of beads on each other arm of that joint connector; the beads in at least one arm extending the length of said arm outwardly from said center section, a plurality of stringers composed of high impact styrene, each of said stringers having a hollow square cross-section interior, each of said stringers having a first rectangular stringer wall, a second rectangular stringer wall, a third rectangular stringer wall and a fourth rectangular stringer wall, each of said extruded stringers being adapted to receive one of said arms of said joint connectors, said extruded stringers being adapted to fit flush with said hollow cubical center sections; and a plurality of frosted square shelves, each of said frosted square shelves having a plurality of right angle notches formed in a plurality of shelf corners, each of said frosted square shelves of said plurality having a plurality of pins, each pin of said plurality of pins being positioned adjacent a respective right angle notch, each shelf of said plurality being adapted to be positioned in contact with one or more of said extruded stringers in an abutting relationship with other shelves of said plurality, each shelf being composed of a general purpose styrene.

2. A shelving apparatus for holding articles comprising: a plurality of joint connectors, each joint connector of the plurality of joint connectors having a center section and a plurality of arms extending outward from the center section, each arm of said plurality of arms having a U-shaped cross-section and a pair of free edges extending along said arm, each of said arms having a pair of parallel beads formed integral therewith for stiffening the respective arm, each pair of parallel beads of each arm on a given joint connector being parallel to each other pair of parallel beads on each other arm of that joint connector; the beads in at least one arm extending the length of said arm outwardly from said center section, a plurality of stringers being adapted to receive an arm of a joint connector for frictionally holding the arm inside the stringer, each of said stringers having a hollow interior and having exterior dimensions substantially equal to the size of the center section to have a flush fit with said center section of the respective joint connector; and a plurality of shelves being positionable on the stringers to be supported thereby.

* * * * *